2,851,462

SOLUTIONS AND SWOLLEN MASSES OF POLYMERIZED TRIFLUOROCHLORETHYLENE

Otto Fuchs, Frankfurt am Main Hochst, and Anton Staller, Frankfurt am Main Sindlingen, Germany, assignors to Farbwerke Hoechst Aktiengesellschaft vormals Meister Lucius & Bruning, Frankfurt am Main Hochst, Germany, a company of Germany No Drawing. Application June 29, 1953
Serial No. 364,935

Claims priority, application Germany July 2, 1952

5 Claims. (Cl. 260—29.8)

The present invention relates to solutions and swollen masses of polymerized trifluorochlorethylene, i. e., polytrifluorochlorethylene. We have found that solutions or swollen masses of polymerized trifluorochlorethylene can be prepared in a very advantageous manner by using as solvents, swelling agents, diluents or plasticisers oxygen-containing menthane derivatives of the terpene or camphor class.

The above defined menthane derivatives include saturated and unsaturated oxygen-containing compounds of the terpene and camphor classes which are of the type of alcohols, aldehydes, ketones, esters or ethers.

There may be mentioned, for example, terpin, terpineol, pinole hydrate and borneol; perillaldehyde and cuminaldehyde; menthone, piperitone, pulegone, carvone, camphor, camphenilone, fenchone, thujone and verbenone; menthyl, terpinyl and bornyl esters; cineol and pinole.

There may also be used mixtures of these compounds with each other or with other solvents, swelling agents or non-solvents. As suitable components there may be mentioned aliphatic compounds which contain several fluorine and chlorine atoms, and advantageously 15–25 percent of fluorine, 60–70 percent of chlorine and 10–20 percent of carbon, such as 1.2.2-trifluoro-1.1.3.3.3-pentachloropropane, 2.2 - difluoro - 1.3.3.3 - tetrachloropropane and 1.2.3-trifluoro-1.1.2.3.3-pentachloropropane, and also the compounds mentioned in United States patent specification No. 2,542,070.

As additional components there may also be used cyclic compounds which contain bound to the nucleous at least one unsubstituted alkyl or alkylidene group or an alkyl group substituted by chlorine, and at least one chlorine atom. Among these compounds there may be mentioned, for instance, 4-chloro-1.3-xylene, 2-chloro-1.4-xylene, 4-chlorotoluene, 2.5-dichloro-toluene, 2.6- or 3.4- or 3.5-dichlorotoluene, 2.4-dichlorobenzalchloride, 2.4.5-trichlorotoluene and chlorocymene.

As such additions there come also into consideration heterocyclic compounds which contain a nitrogen atom in the ring and at least one alkyl or alkylidene group, such as 2-methyl-pyridine, 2.8-dimethyl-quinoline, 2.4.6-trimethylpyridine and 2.5.6.8-tetramethyl-quinoline.

It is also possible to use as an addition 1.1.2.2-tetrafluoro-3.3.4.4-tetrachlorocyclobutane alone or in admixture with a compound of the kind mentioned above.

Finally it may also be of advantage to add to the solutions or swollen masses of polymerized trifluorochlorethylene, cyclohexanone or non-cyclic ketones boiling above 110° C. which contain at least one alkyl or aryl group or a chlorine atom, such as mesityl oxide, acetophenone, dimethyl-acetophenone, chloro-diisopropyl ketone, ω-chloracetophenone, ω-chloropropiophenone, 2-methylheptene-(2)-one-(6), phorone or methyl-cyclohexanone either alone or in admixture with each other.

Depending on the choice of the components of the mixture and on the temperature used, there can be prepared from polymerized trifluorochlorethylene with the use of the said compounds, homogeneous solutions or clear masses having a soft and plastic consistency which remains constant. Such solutions, having, for example, a lacquer-like consistency or such plasticized masses are suitable not only for the preparation of coatings on appropriate surfaces, but also for the manufacture of foils, bands, tubes, threads or similar structures. For this purpose the solutions or masses are generally worked up at a raised temperature, and the solvent is removed in the manner customary in such operations.

The following compounds of the classes above defined have proved to be especially useful as solvents when used alone: camphor, camphenilone, fenchone, cineol and pinole. It is especially remarkable that by means of these and related compounds it is possible to prepare at raised temperatures solutions containing from about 5 to about 25 percent of the polymer, and which solutions are well capable of being worked up. Solutions having any desired concentration of polymer below 5 percent may, of course, be prepared.

Among the many possible compositions and methods of preparing them a few examples are given below for the purpose of illustration.

*Plasticization of polymerized trifluorochlorethylene*

Among the menthane derivatives referred to above, more especially those of the alcohol and ester types act as strong swelling agents, without, however, possessing pronounced solvent properties. Cyclic ketones of simple constitution, such as menthone, carvone or the like, also possess only swelling properties. For example, carvone has a swelling action on polymerized trifluorochlorethylene at temperatures from about 130° C. upwards, and at about 165–170° C. soft, homogeneous, almost transparent masses are formed. Terpineol has the same good effect as, for instance, a mixture of dipentene with a compound of the terpene series containing oxygen. Terpineol has a swelling action on polymerized trifluorochlorethylene at about 150° C. such that a very soft clear mass is formed which can easily be moulded in the plastic state at about 100° C., and which is distinguished by its capacity for being formed into very fine threads.

Bornyl acetate acts in a similar manner. It has a swelling action on polymerized trifluorochlorethylene at temperatures from about 135–140° C. upwards such as to yield a coherent clear mass, which at about 160–165° C. has a consistency such that it is capable of flowing and of being drawn out into threads.

*Preparation of solutions of polymerized trifluorochlorethylene*

Such solutions can generally be prepared at temperatures within the range of about 100° C. to about 200° C. However, solutions can also be prepared at temperatures below this range, depending on the molecular weight of the polymer and the constitution of the solvent.

Powerful solvents for polymerized trifluorochlorethylene are, for example, ketones belonging to the class of camphor derivatives, and also ethers of the type of cineol, pinole and the like. Camphor alone dissolves polymerized trifluorochlorethylene at about 175° C. to give a solution of 12 percent strength, and the solution remains clear and homogeneous down to about 162° C. In the case of fenchone the corresponding temperatures are about 160° C. and 152° C., respectively. Cineol dissolves the polymer at about 130° C., and the resulting solution of 12 percent strength remains clear and homogeneous down to about 128° C.

In the following table are given examples of solutions of polymerized trifluorochlorethylene in solvent mixtures consisting of one of the solvents of this invention in admixture with another solvent or swelling agent or non-solvent described in the literature. The solvent power of the solvent mixtures will be seen from the temperature at which a solution of 12 percent strength is still clear and homogeneous.

In preparing the solvent mixtures, the proportion of the known solvent in the mixture may range from 1–2 to 100 percent.

| Solvent mixture | Solution of 12 percent strength still clear and homogeneous at— |
|---|---|
| 100 parts by weight of camphor+100 parts of weight of 1.1.2.2-tetrafluoro-3.3.4.4-tetrachloro-cyclobutane. | About 124° C. |
| 75 parts by weight of camphor+25 parts by weight of 1.2.3-trifluoro-pentachloropropane. | About 140° C. |
| 75 parts by weight of camphor+25 parts by weight of pseudocumene. | About 146° C. |
| 100 parts by weight of camphor+100 parts by weight of camphene. | About 148° C. |
| 75 parts by weight of camphor+25 parts by weight of para-cymene. | About 160° C. |
| 75 parts by weight of camphor+25 parts by weight of solvent naphtha. | About 144° C. |
| 75 parts by weight of camphor+25 parts by weight of decahydronaphthalene. | About 150° C. |
| 100 parts by weight of fenchone+100 parts by weight of 1.1.2.2-tetrafluoro-3.3.4.4-tetrachloro-cyclobutane. | About 103° C. |
| 75 parts by weight of fenchone+25 parts by weight of 1.2.3-trifluoro-pentachloropropane. | About 120° C. |
| 75 parts by weight of fenchone+25 parts by weight of pseudocumene. | About 135° C. |
| 75 parts by weight of fenchone+25 parts by weight of para-cymene. | About 145° C. |
| 75 parts by weight of fenchone+25 parts by weight of solvent naphtha. | About 150° C. |
| 75 parts by weight of fenchone+25 parts by weight of decahydronaphthalene. | About 152° C. |
| 100 parts by weight of cineol+100 parts by weight of 1.1.2.2-tetrafluoro-3.3.4.4-tetrachlorocyclobutane. | About 106° C. |
| 75 parts by weight of cineol+25 parts by weight of 1.2.3-trifluoro-pentachlorobutane. | About 120° C. |

We claim:
1. A composition of matter comprising polytrifluorochlorethylene and at least one oxygen containing compound selected from the group consisting of terpin, terpineol, pinole hydrate, borneol, perillaldehyde, cuminaldehyde, menthone, piperitone, pulegone, carvone, camphor, campenilone, fenchone, thujone, verbenone, cineol, pinole, and bornyl acetate.
2. A composition of matter comprising polytrifluorochlorethylene and terpineol.
3. A composition of matter comprising polytrifluorochlorethylene and bornyl acetate.
4. A composition of matter comprising polytrifluorochlorethylene and camphor.
5. A composition of matter comprising polytrifluorochlorethylene and cineol.

References Cited in the file of this patent

UNITED STATES PATENTS

| | | |
|---|---|---|
| 2,201,395 | Fletcher | May 21, 1940 |
| 2,360,898 | Sarbach | Oct. 24, 1944 |
| 2,440,190 | Alfthan | Apr. 20, 1948 |
| 2,519,442 | Delorme et al. | Aug. 22, 1950 |
| 2,535,020 | Stephan | Dec. 19, 1950 |
| 2,686,738 | Teeters | Aug. 17, 1954 |